United States Patent
Chiang

(10) Patent No.: US 8,477,107 B2
(45) Date of Patent: Jul. 2, 2013

(54) FUNCTION SELECTION SYSTEMS AND METHODS

(75) Inventor: Chi-Pang Chiang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 333 days.

(21) Appl. No.: 12/558,287

(22) Filed: Sep. 11, 2009

(65) Prior Publication Data

US 2010/0117973 A1 May 13, 2010

(30) Foreign Application Priority Data

Nov. 12, 2008 (TW) ................................ 97143653 A

(51) Int. Cl.
*G06F 3/041* (2006.01)
(52) U.S. Cl.
USPC .......................................... 345/173; 345/174
(58) Field of Classification Search
None
See application file for complete search history.

(56) References Cited

U.S. PATENT DOCUMENTS

| | | | | |
|---|---|---|---|---|
| 5,469,540 A | * | 11/1995 | Powers et al. ................. | 715/203 |
| 5,528,260 A | * | 6/1996 | Kent ............................. | 345/684 |
| 5,821,930 A | * | 10/1998 | Hansen ......................... | 715/702 |
| 5,907,327 A | * | 5/1999 | Ogura et al. .................. | 715/764 |
| 6,958,749 B1 | * | 10/2005 | Matsushita et al. ........... | 345/175 |
| 7,750,893 B2 | * | 7/2010 | Hashimoto et al. ........... | 345/173 |
| 8,042,044 B2 | * | 10/2011 | Van Leeuwen ............... | 715/702 |
| 8,185,098 B2 | * | 5/2012 | Lee ............................... | 455/418 |
| 8,217,904 B2 | * | 7/2012 | Kim ............................. | 345/173 |
| 2003/0206202 A1 | * | 11/2003 | Moriya ......................... | 345/846 |
| 2004/0066392 A1 | * | 4/2004 | Ueda ............................ | 345/629 |
| 2004/0263491 A1 | * | 12/2004 | Ishigaki ........................ | 345/177 |
| 2006/0197753 A1 | * | 9/2006 | Hotelling ...................... | 345/173 |
| 2007/0152984 A1 | * | 7/2007 | Ording et al. ................. | 345/173 |
| 2007/0157089 A1 | * | 7/2007 | Van Os et al. ................. | 715/702 |
| 2007/0252822 A1 | * | 11/2007 | Kim et al. ..................... | 345/173 |
| 2008/0119237 A1 | * | 5/2008 | Kim .............................. | 455/566 |
| 2008/0282194 A1 | * | 11/2008 | Chiang et al. ................. | 715/835 |
| 2009/0278805 A1 | * | 11/2009 | Kao et al. ...................... | 345/173 |
| 2010/0087228 A1 | * | 4/2010 | Griffin et al. ................. | 455/566 |

FOREIGN PATENT DOCUMENTS

| | | |
|---|---|---|
| CN | 101059744 A | 10/2007 |
| CN | 101303645 A | 11/2008 |

* cited by examiner

*Primary Examiner* — Dismery Mercedes
(74) *Attorney, Agent, or Firm* — Birch, Stewart, Kolasch & Birch, LLP

(57) ABSTRACT

Function selection system and method for use in an electronic device are provided. The system includes a display unit and a processing unit. The display unit has a display area, and displays a specific region within the display area. The processing unit selects one of a plurality of functions according to a position of the specific region in the display area. The specific region is removable, and used to display data generated by the selected function.

16 Claims, 10 Drawing Sheets

FUNCTION SELECTION SYSTEMS AND METHODS

CROSS REFERENCE TO RELATED APPLICATIONS

This Application claims priority of Taiwan Patent Application No. 97143653, filed on Nov. 12, 2008, the entirety of which is incorporated by reference herein.

BACKGROUND OF THE INVENTION

1. Field of the Invention

The disclosure relates generally to function selection systems and methods, and, more particularly to systems and methods that select a function according to a position of a specific region displayed in a display area.

2. Description of the Related Art

Recently, portable devices, such as handheld devices, have become more and more technically advanced and multifunctional. For example, a handheld device may have e-mail message capabilities, an advanced address book management system, a media playback system, and various other functions. Due to increased convenience and functions of the devices, these devices have become necessities of life.

Handheld devices are usually equipped with input devices for controlling the applications in the devices. For example, users can perform related operations using a touch-sensitive device provided by a handheld device. Users can slide their finger on the surface of the touch-sensitive device, thus to perform operations corresponding to various functions. Generally, when users want to switch functions, users must repeatedly unfold, move, and select specific function items in a menu, thus completely switching between functions. For example, when users want to activate a music player of a mobile phone, users must open a main menu, and then select a multimedia menu therein. Thereafter, a function of the music player can be therefore activated. At the time, if users want to switch to other functions, users must return to the main menu for further operations and selections. The described operations are complex, inconvenient, and time-consuming for users. In some situations, the time spent on switching between functions may exceed the time spent on actually operating the function.

BRIEF SUMMARY OF THE INVENTION

Function selection systems and methods are provided.

An embodiment of a function selection system includes a display unit and a processing unit. The display unit has a display area, and displays a specific region within the display area. The processing unit selects one of a plurality of functions according to a position of the specific region in the display area. The specific region is removable, and used to display data generated by the selected function.

In an embodiment of a function selection method, a specific region is displayed within a display area of a display unit. Then, one of a plurality of functions is selected according to a position of the specific region in the display area. The specific region is removable, and used to display data generated by the selected function.

Function selection systems and methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Function selection systems and methods are provided.

Figure 1:
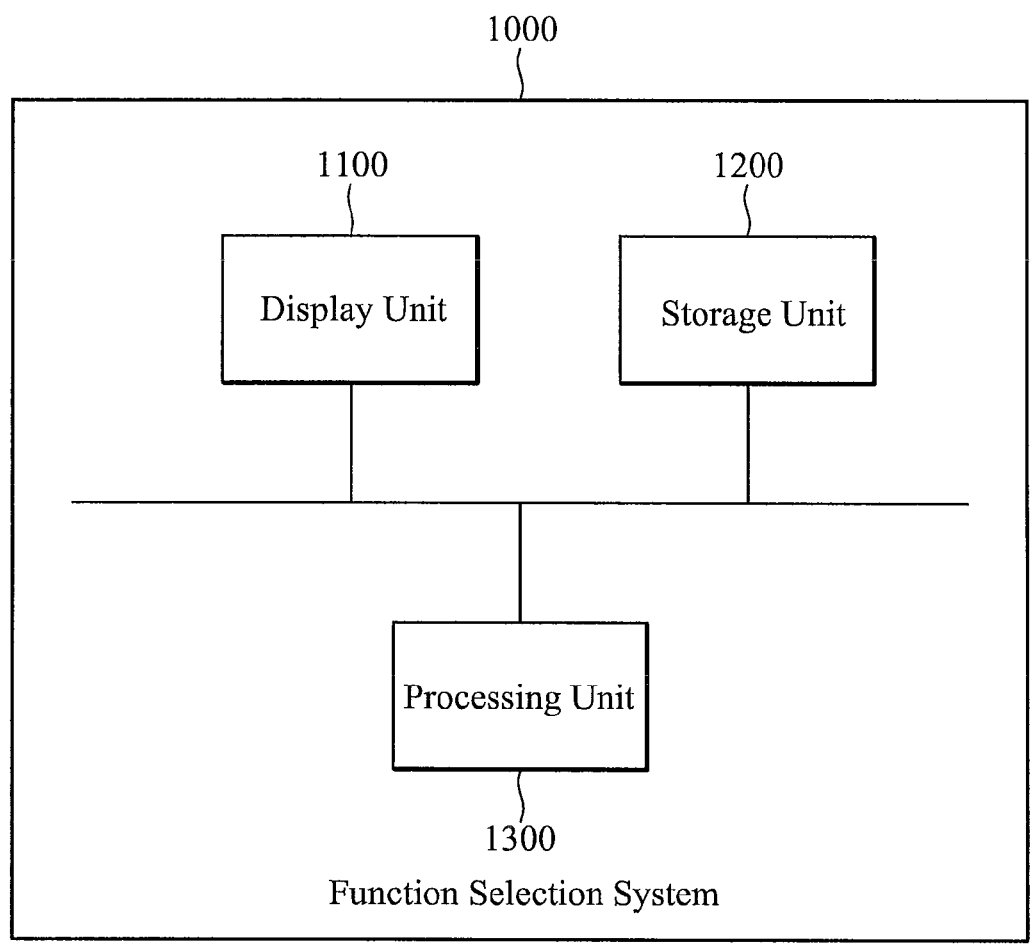
FIG. 1 is a schematic diagram illustrating an embodiment of a function selection system of the invention.

FIG. 1 is a schematic diagram illustrating an embodiment of a function selection system of the invention. The function selection system can be used in an electronic device, such as a portable device comprising handheld devices such as a media player, a PDA (Personal Digital Assistant), a GPS (Global Positioning System) device, a smart phone, and a mobile phone.

Figure 2:
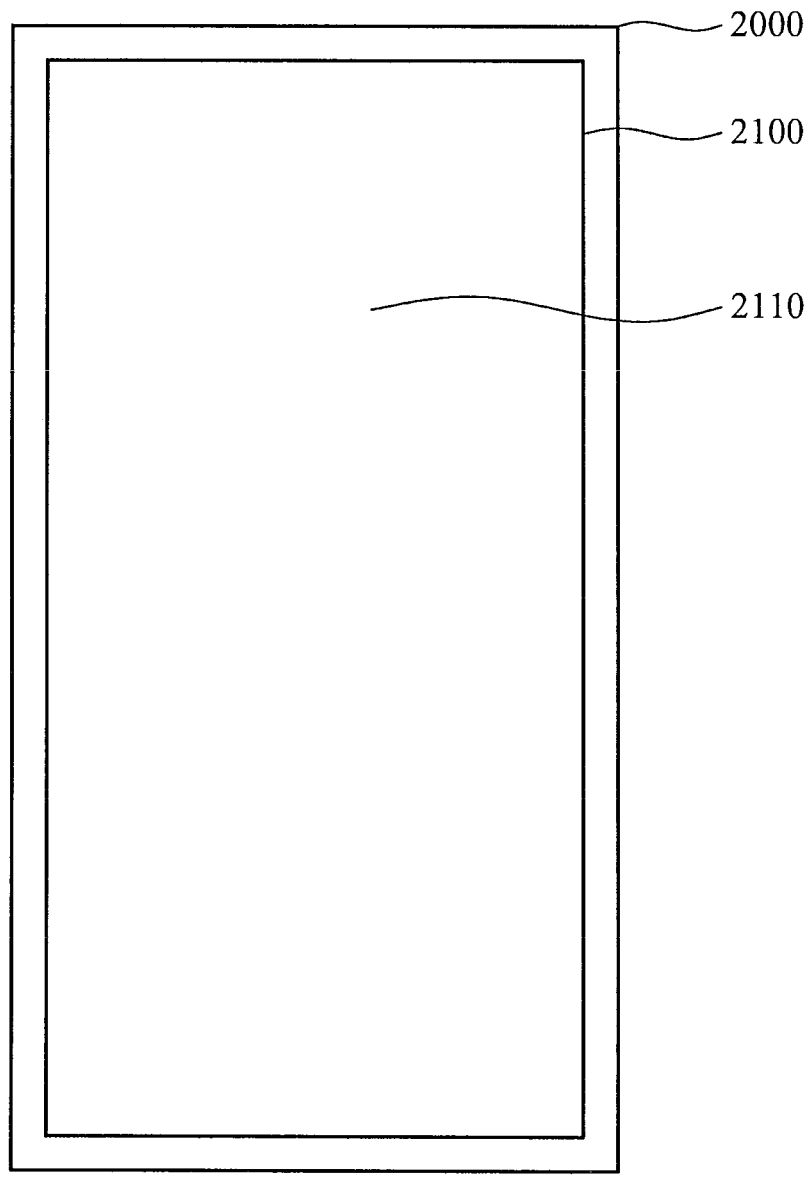
FIG. 2 is a schematic diagram illustrating an embodiment of an electronic device having a display unit of the invention.

The function selection system 1000 comprises a display unit 1100, a storage unit 1200, and a processing unit 1300. The display unit 1100 can be used to display figures, operational interfaces, and/or related information corresponding to various functions. FIG. 2 is a schematic diagram illustrating an embodiment of an electronic device having a display unit of the invention. As shown in FIG. 2, the electronic device 2000 has a display unit 2100 having a display area 2110. Different regions of the display area 2110 can be respectively displayed. In some embodiments, the display unit 1100 can be integrated with a touch-sensitive device (not shown) as a touch-sensitive screen. The touch-sensitive device has a touch-sensitive surface comprising sensors in at least one dimension to detect contact and movement of an input tool, such as a stylus or finger on the touch-sensitive surface. The storage unit 1200 comprises a plurality of functions, and figures, operational interfaces, and/or related information corresponding to various functions. In some embodiments, the functions may comprise a phone function, a camera function, a game function, a radio function, and a media playback function. It is noted that, the described functions are examples of the embodiment, and the invention is not limited thereto. Additionally, the storage unit 1200 can store data, and provide data for the display unit 1100 for display. The processing unit 1300 performs the function selection method of the invention, which will be discussed further in the following paragraphs.

Figure 3:
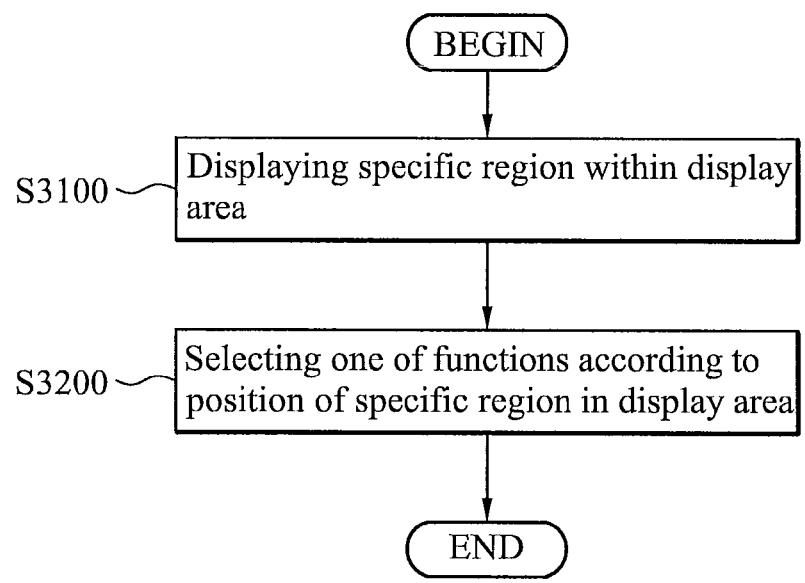
FIG. 3 is a flowchart of an embodiment of a function selection method of the invention.

FIG. 3 is a flowchart of an embodiment of a function selection method of the invention. The function selection method can be used for an electronic device having a display unit, such as a portable device comprising handheld devices such as a media player, a PDA, a GPS device, a smart phone, and a mobile phone.

In step S3100, a specific region is displayed within a display area of the display unit. It is understood that, the specific region can be displayed at any position of the display area, and be removable. The position of the specific region in the display area can be determined according to various requirements and applications. Then, in step S3200, one of a plurality of functions is selected according to the position of the specific region in the display area. It is noted that, in some embodiments, the selected function can be directly activated. The specific region can be used to display data generated by the selected function.

Figure 4A:
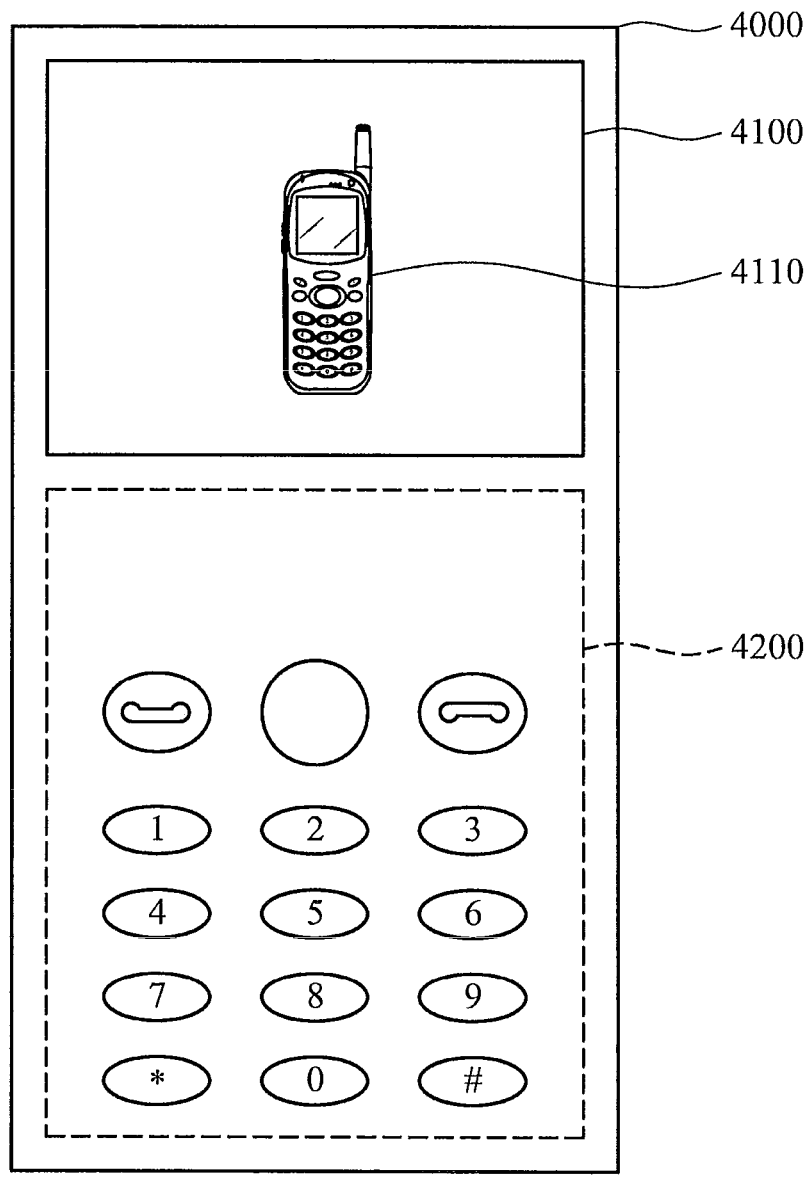
FIGS. 4A to 4E are schematic diagrams respectively illustrating various functions corresponding to various positions of a specific region in a display area.
Figure 4B:
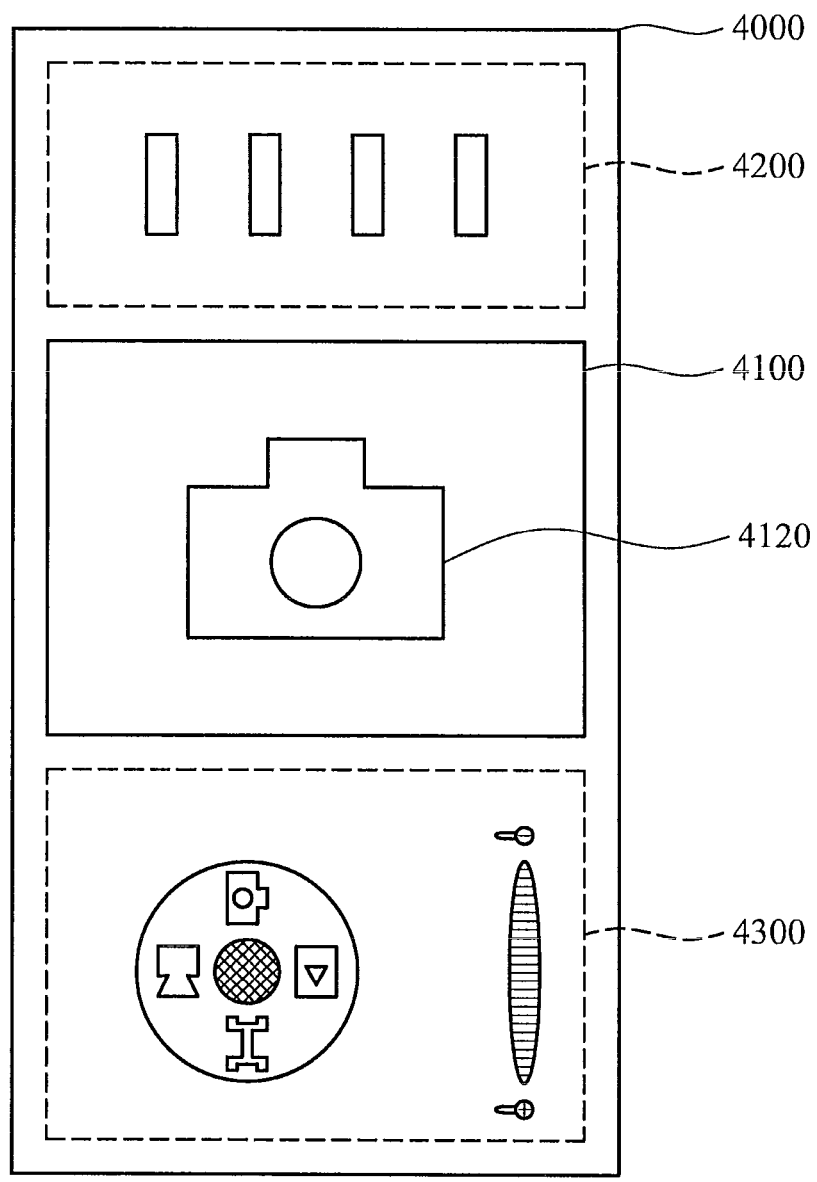
Figure 4C:
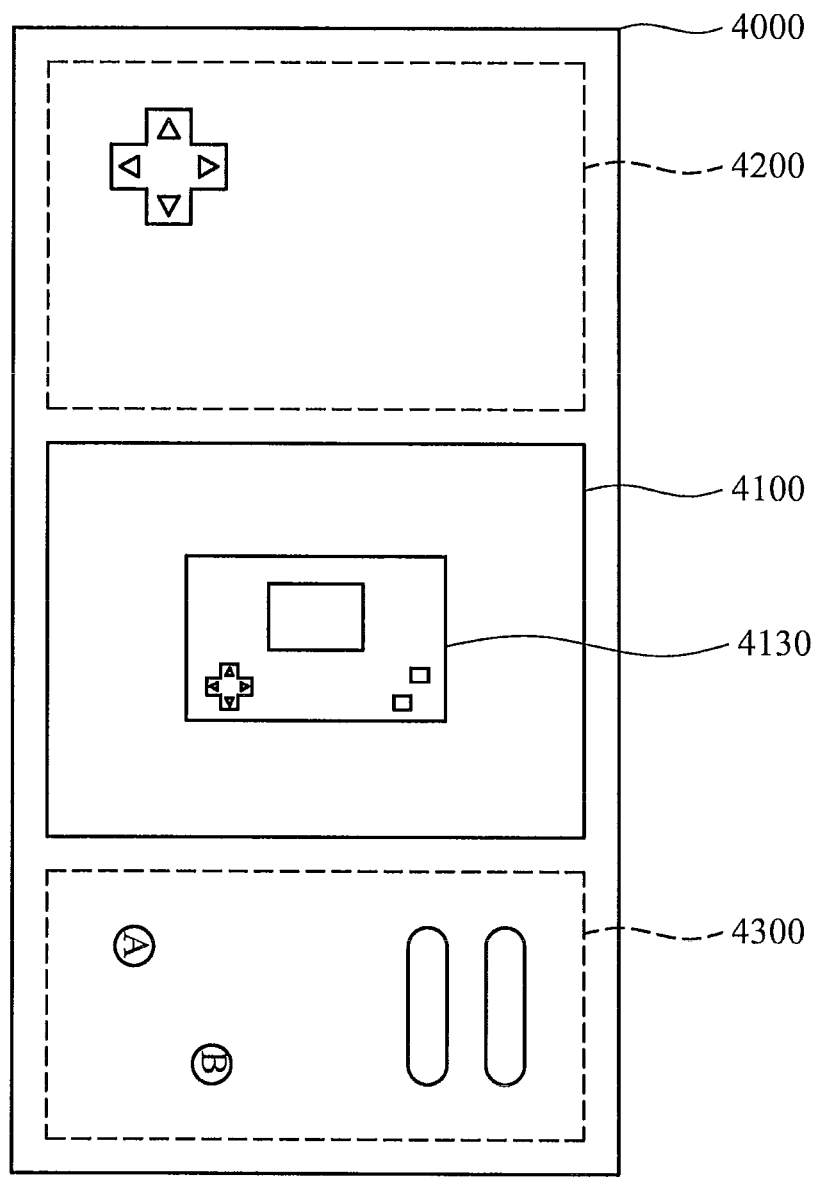
Figure 4D:
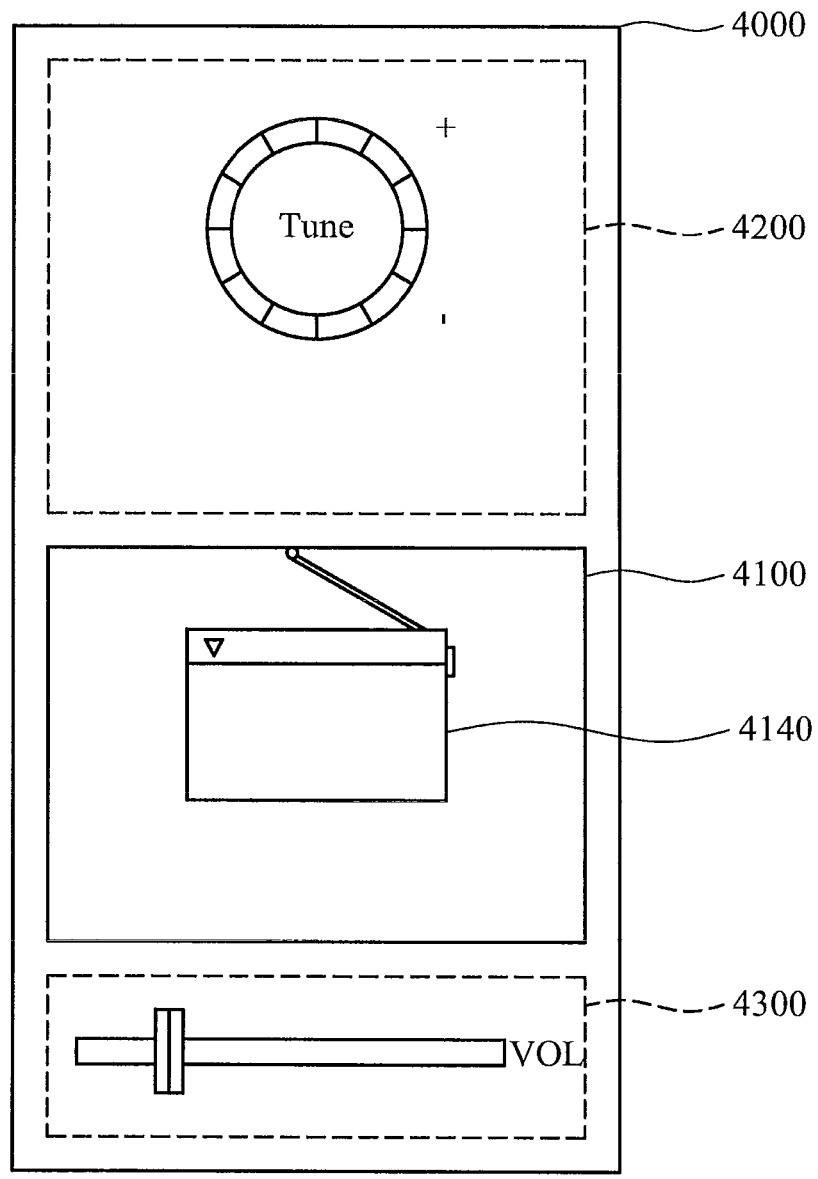
Figure 4E:
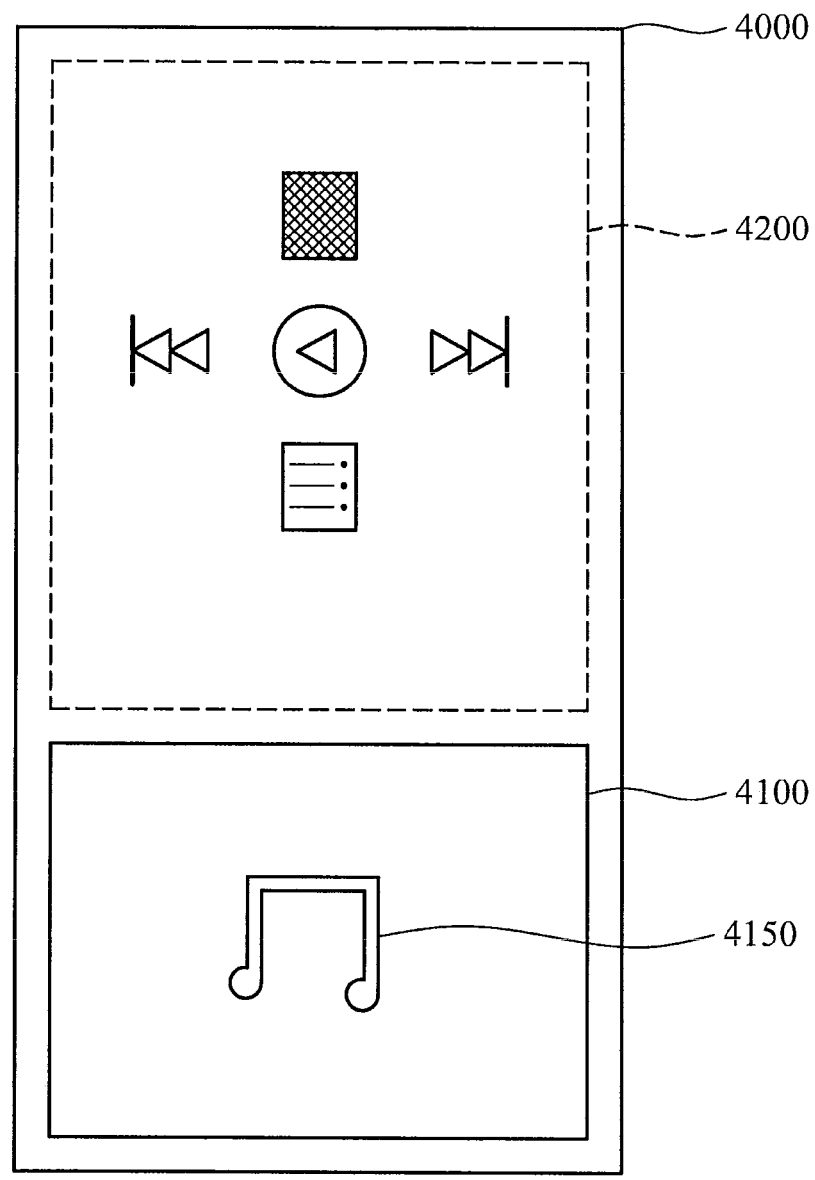

It is understood that, the functions respectively corresponding to various positions of the specific region in the display area can be defined in the electronic device in advance. FIGS. 4A to 4E are schematic diagrams respectively illustrating various functions corresponding to various positions of a specific region in a display area. When the specific region 4100 is at a first position of the display area 4000, as shown in FIG. 4A, the corresponding function may be the phone function. It is noted that, a figure 4110 corresponding to the phone function can be displayed in the specific region 4100. Additionally, the other region 4200 of the display area 4000 except the specific region 4100 can display a control interface corresponding to the phone function. When the specific region 4100 is at a second position of the display area 4000, as shown in FIG. 4B, the corresponding function may be the camera function. Similarly, a figure 4120 corresponding to the camera function can be displayed in the specific region 4100. Additionally, the other regions 4200 and 4300 of the display area 4000 except the specific region 4100 can display a control interface corresponding to the camera function. When the specific region 4100 is at a third position of the display area 4000, as shown in FIG. 4C, the corresponding function may be the game function. Similarly, a figure 4130 corresponding to the game function can be displayed in the specific region 4100. Additionally, the other regions 4200 and 4300 of the display area 4000 except the specific region 4100 can display a control interface corresponding to the game function. When the specific region 4100 is at a fourth position of the display area 4000, as shown in FIG. 4D, the corresponding function may be the radio function. Similarly, a figure 4140 corresponding to the radio function can be displayed in the specific region 4100. Additionally, the other regions 4200 and 4300 of the display area 4000 except the specific region 4100 can display a control interface corresponding to the radio function. When the specific region 4100 is at a fifth position of the display area 4000, as shown in FIG. 4E, the corresponding function may be the media playback function. Similarly, a figure 4150 corresponding to the media playback function can be displayed in the specific region 4100. Additionally, the other region 4200 of the display area 4000 except the specific region 4100 can display a control interface corresponding to the media playback function. It is understood that, the positions corresponding to different functions are overlapped in the described examples. In some embodiments, however, the positions corresponding to different functions may not be overlapped. It is noted again, that the described functions and corresponding positions are examples of the embodiment, and the invention is not limited thereto.

Figure 5:
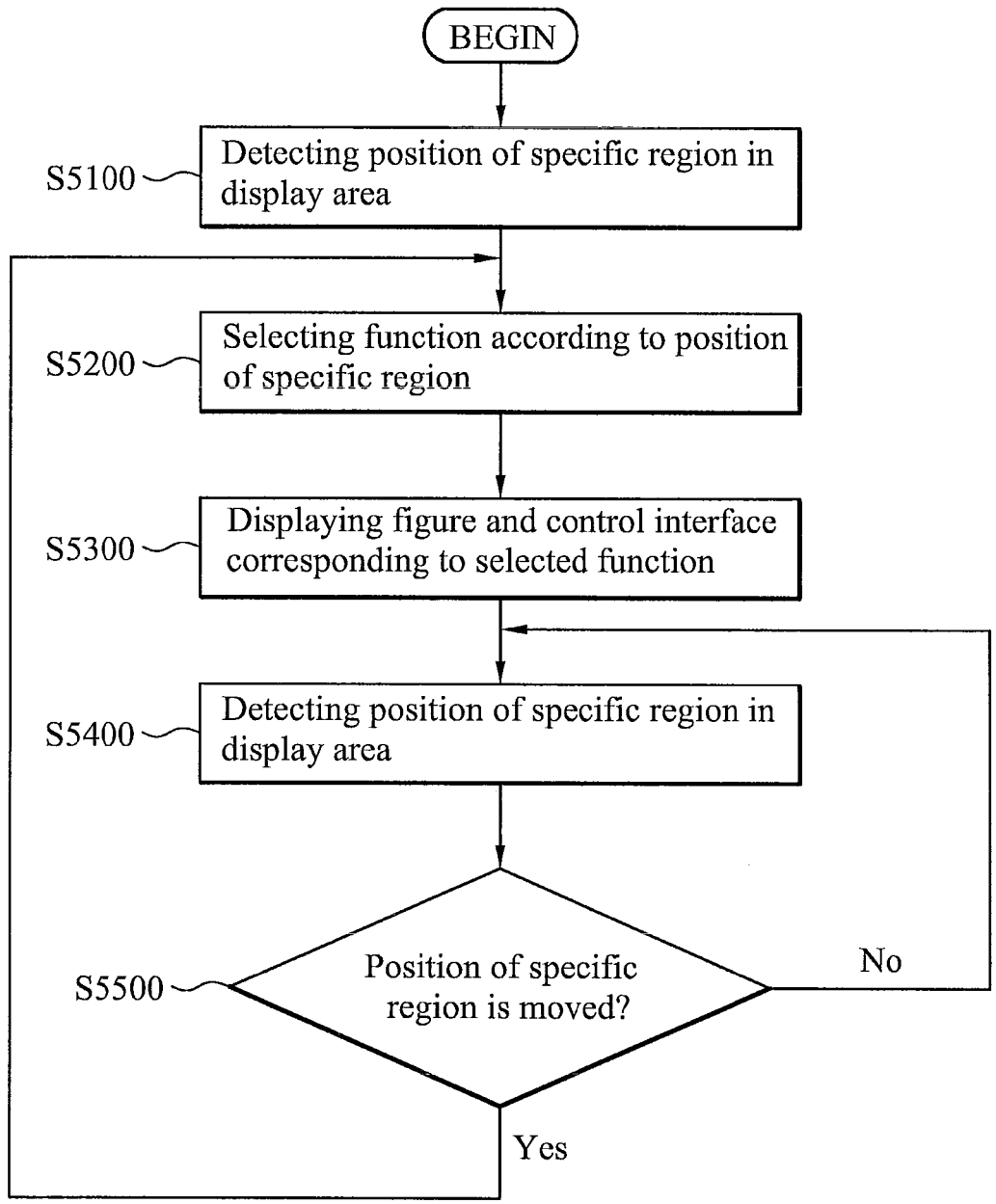
FIG. 5 is a flowchart of an embodiment of a function selection method of the invention.

FIG. 5 is a flowchart of an embodiment of a function selection method of the invention. The function selection method can be used for an electronic device having a display unit, such as a portable device comprising handheld devices such as a media player, a PDA, a GPS device, a smart phone, and a mobile phone.

In step S5100, the position of the specific region in the display area of the display unit is detected. Similarly, the specific region is removable. In step S5200, one of a plurality of functions is selected according to the position of the specific region in the display area, and/or the selected function is activated. Similarly, the functions respectively corresponding to various positions of the specific region in the display area can be defined in the electronic device in advance. In step S5300, a figure corresponding to the selected function is displayed in the specific region, and a control interface corresponding to the selected function is displayed in the region of the display area except the specific region. It is noted that, the specific region can display data generated by the selected function. In step S5400, the position of the specific region in the display area of the display unit is detected. In step S5500, it is determined whether the position of the specific region in the display area is moved. If the position of the specific region in the display area is not moved (No in step S5500), the procedure returns to step S5400. If the position of the specific region in the display area is moved (Yes in step S5500), the procedure returns to step S5200, another function is re-selected according to the new position of the specific region in the display area, and/or the re-selected function is activated, and in step S5300, a figure corresponding to the re-selected function and/or data generated by the re-selected function are displayed in the specific region, and a control interface corresponding to the re-selected function is displayed in the region of the display area except the specific region. Then, steps S5400 and S5500 are performed.

It is understood that, the determination of whether the position of the specific region in the display area is moved can be implemented in various manners. In some embodiments, when the display unit is a touch-sensitive screen, it is determined whether at least one contact corresponding to at least one specific position of the specific region, such as any position on the specific region or at least two edges of the specific region, on the touch-sensitive screen has been detected, and whether the contact is moved. If the contact corresponding to the specific position of the specific region on the touch-sensitive screen is detected and moved, the position of the specific region in the display area is determined to have been moved. It is noted that, the specific region can be moved according to the movement of the contact. In some embodiments, it is determined whether a contact corresponding to a scroll bar displayed in the touch-sensitive screen has been detected, and whether the contact is moved. If the contact corresponding to the scroll bar displayed in the touch-sensitive screen is detected and moved, the position of the specific region in the display area is determined to have been moved. Similarly, the specific region can be moved according to the position of the contact on the scroll bar and the movement of the contact. In some embodiments, the electronic device can be additionally equipped with a control key (not shown) to determine the position of the specific region in the display area. Therefore, the determination of whether the position of the specific region in the display area is moved can be performed by determining whether the control key is operated. In some embodiments, the electronic device can be additionally equipped with a sensor (not shown) to detect the position of an input tool, such as a stylus or finger. Therefore, the determination of whether the position of the specific region in the display area has been moved can be performed by determining whether the detected position of the input tool is moved. It is understood that, the described embodiments are examples of the invention, and not limited thereto.

Figure 6A:
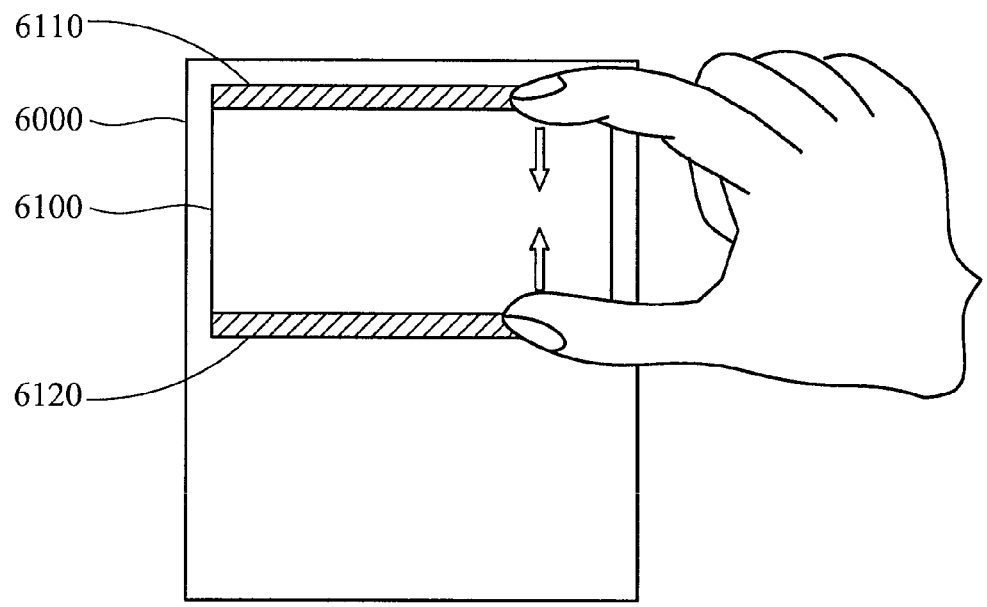
FIGS. 6A and 6B are schematic diagrams illustrating an embodiment of size adjustment for the specific region of the invention.
Figure 6B:
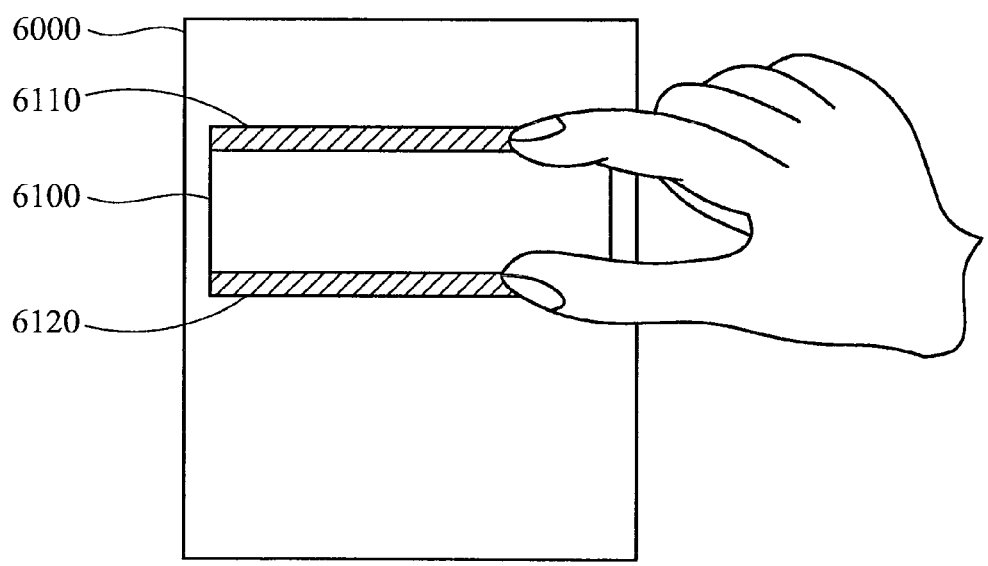

In some embodiments, the size of the specific region can be adjusted. When the display unit is a touch-sensitive screen, contacts respectively corresponding to two edges of the specific region on the touch-sensitive screen are detected, and it is determined whether the contacts have been moved. If the contacts respectively corresponding to the two edges of the specific region on the touch-sensitive screen are detected, and at least one of the contacts is moved, the size of the specific region is adjusted according to the new positions of the two moved contacts. For example, when fingers contact two edges 6110 and 6120 of the specific region 6100 in the display area 6000, and move closer to each other, as shown in FIG. 6A, the size of the specific region 6100 is adjusted according to the positions of the contacts corresponding to the two edges 6110 and 6120, as shown in FIG. 6B. In some embodiments, when the contacts corresponding to the two edges move closer to each other, and/or a distance between the two contacts is less than a predefined threshold, the display unit can be locked. In some embodiments, when the display unit is locked, a mark can be displayed in the display unit to indicate the position of the specific region, and a figure can be further displayed in the display unit to represent that the display unit is locked. Additionally, when the display unit is locked, and contacts corresponding to two edges of the specific region are detected to have moved apart, and/or a distance between the two contacts is greater than the predefined threshold, the display unit can be unlocked. It is noted that, a function can be automatically determined and/or activated according to the position of the expanded specific region.

Therefore, the function selection systems and methods of the invention can select a function according to the position of the specific region displayed in the display area. Function switching can be easily accomplished by changing the position of the specific region.

Function selection systems and methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A function selection system for use in an electronic device, comprising:
    a display unit having a display area and a touch-sensitive screen, and displaying a specific region within the display area, the specific region is determined by detecting a contact at the touch-sensitive screen within the display area; and
    a processing unit selecting one of a plurality of functions according to a position of the specific region in the display area, and displaying a control interface corresponding to the selected function in a region of the display area except the specific region via the display unit in response to the contact detected,
    wherein the specific region is removable, and used to display data generated by the selected function,
    wherein the processing unit further determines whether the position of the specific region in the display area has been moved, and when the position of the specific region in the display area is moved, re-selects one of the functions according to the position of the moved specific region.

2. The system of claim 1, wherein the processing unit further displays a figure corresponding to the selected function via the display unit.

3. The system of claim 1, wherein the processing unit determines whether the position of the specific region in the display area has been moved by determining whether at least one second contact corresponding to at least one specific position of the specific region on the touch-sensitive screen is detected, and whether the second contact is moved.

4. The system of claim 1, wherein the display unit further comprises a sensor to detect a position of an input tool, and the processing unit determines whether the position of the specific region in the display area has moved by determining whether the detected position of the input tool is moved.

5. The system of claim 1, wherein the processing unit further determines whether contacts respectively corresponding to two edges of the specific region on the touch-sensitive screen are detected, and determines whether the contacts have moved closer to each other, and when the contacts are detected and have moves closer to each other, the processing unit locks the display unit.

6. The system of claim 5, wherein the processing unit further adjusts a size of the specific region according to the positions of the contacts.

7. The system of claim 5, wherein the processing unit further determines whether contacts respectively corresponding to the two edges of the specific region on the touch-sensitive screen are detected, and determines whether the contacts have moved apart, and when the contacts are detected and does moved apart, the processing unit unlocks the display unit.

8. A function selection method for use in an electronic device, comprising:
    detecting a contact on a specific region within a display area of a display unit comprising a touch-sensitive screen;
    selecting one of a plurality of functions according to a position of the specific region in the display area;
    displaying a control interface corresponding to the selected function in a region of the display area except the specific region via the display unit in response to the contact detected,
    wherein the specific region is removable, and used to display data generated by the selected function;
    determining whether the position of the specific region in the display area has moved; and
    when the position of the specific region in the display area is moved, re-selecting one of the functions according to the position of the moved specific region.

9. The method of claim 8, further comprising displaying a figure corresponding to the selected function via the display unit.

10. The method of claim 8, wherein the determination of whether the position of the specific region in the display area has moved is performed by determining whether at least one second contact corresponding to at least one specific position of the specific region on the touch-sensitive screen is detected, and whether the second contact is moved.

11. The method of claim 10, wherein the at least one specific position comprises any position on the specific region or at least two edges of the specific region.

12. The method of claim 8, wherein the determination of whether the position of the specific region in the display area has moved is performed by determining whether a second contact corresponding to a scroll bar displayed in the touch-sensitive screen is detected, and whether the second contact is moved.

13. The method of claim 8, wherein the determination of whether the position of the specific region in the display area has moved is performed by determining whether a control key is operated, wherein the control key is used to determine the position of the specific region in the display area.

14. The method of claim 8, wherein the determination of whether the position of the specific region in the display area has moved is performed by determining whether a position of an input tool detected by a sensor is moved.

15. The method of claim 8, wherein the display unit comprises a touch-sensitive screen, and the method further comprises the steps of:
determining whether contacts respectively corresponding to two edges of the specific region on the touch-sensitive screen are detected;
determining whether the contacts have moved closer to each other; and
when the contacts are detected and does move closer to each other, locking the display unit.

16. The method of claim 15, further comprising:
determining whether contacts respectively corresponding to the two edges of the specific region on the touch-sensitive screen are detected;
determining whether the contacts have moved apart; and
when the contacts are detected and does moved apart, unlocking the display unit.

* * * * *